United States Patent
Hasegawa

(10) Patent No.: US 10,586,992 B2
(45) Date of Patent: Mar. 10, 2020

(54) FUEL CELL SYSTEM

(71) Applicant: TOYOTA JIDOSHA KABUSHIKI KAISHA, Toyota-shi, Aichi-ken (JP)

(72) Inventor: Takahiko Hasegawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 93 days.

(21) Appl. No.: 15/840,337

(22) Filed: Dec. 13, 2017

(65) Prior Publication Data

US 2018/0175419 A1 Jun. 21, 2018

(30) Foreign Application Priority Data

Dec. 21, 2016 (JP) ................................ 2016-248034

(51) Int. Cl.
| | |
|---|---|
| *H01M 8/04664* | (2016.01) |
| *H01M 8/0438* | (2016.01) |
| *H01M 8/04746* | (2016.01) |
| *H01M 8/04082* | (2016.01) |

(52) U.S. Cl.
CPC ... *H01M 8/04686* (2013.01); *H01M 8/04201* (2013.01); *H01M 8/04388* (2013.01); *H01M 8/04753* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 2008/0138689 A1* | 6/2008 | Leo | H01M 8/04201 |
| | | | 429/444 |
| 2009/0081492 A1 | 3/2009 | Hasuka et al. | |

FOREIGN PATENT DOCUMENTS

| | | |
|---|---|---|
| JP | 2005-302563 A | 10/2005 |
| JP | 2007-165237 | 6/2007 |
| JP | 2013-246935 | 12/2013 |
| JP | 2014-107062 | 6/2014 |
| JP | 2014-123555 A | 7/2014 |

\* cited by examiner

*Primary Examiner* — Wojciech Haske

(74) *Attorney, Agent, or Firm* — Finnegan, Henderson, Farabow, Garrett & Dunner, LLP

(57) ABSTRACT

A controller of a fuel cell system is configured to perform a normal mode in which one of a plurality of injectors is driven in a case where a needed power for the fuel cell stack is lower than a predetermined value, and perform a high load mode in which two or more of the injectors are driven in a case where the needed power is equal to or higher than the predetermined value. The controller is configured to output a driving command to each of the injectors under a condition that the normal mode is to be performed, and detect closing failure in one injector driven under the driving command in a case where a pressure measured by a pressure measurer after a time point at which the driving command is output is lower than a predetermined threshold.

2 Claims, 2 Drawing Sheets

FUEL CELL SYSTEM

INCORPORATION BY REFERENCE

The disclosure of Japanese Patent Application No. 2016-248034 filed on Dec. 21, 2016 including the specification, drawings and abstract is incorporated herein by reference in its entirety.

BACKGROUND

1. Technical Field

The disclosure relates to a fuel cell system.

2. Description of Related Art

In Japanese Unexamined Patent Application Publication No. 2014-107062 (JP 2014-107062 A), a fuel cell system which sequentially detects opening failures of a first injector and a second injector used to supply hydrogen (fuel gas) to a fuel cell stack is described.

SUMMARY

In this type of fuel cell system, it is assumed that one among a plurality of injectors is used at a low load, and all of the injectors are used at a high load.

Here, at a high load at which all the injectors are used, in a case where detection of failure of the injectors that are not driven at a low load is performed, when any of the injectors that are not driven at a low load have closing failure, the supply of a fuel into a fuel cell stack is insufficient because the fuel consumption rate is relatively fast at a high load. Therefore, there is a possibility that the fuel cell stack may deteriorate.

The disclosure provides a fuel cell system capable of suppressing the occurrence of insufficient supply of a fuel into a fuel cell stack at the time of detection of failure and suppressing the deterioration in a fuel cell.

An aspect of the disclosure relates to a fuel cell system comprising: a fuel cell stack; a plurality of injectors configured to supply a fuel gas to the fuel cell stack; a pressure measurer configured to measure a pressure in a fuel supply flow path on which the injectors are provided; and a controller configured to control operations of the injectors. The controller is configured to detect closing failure in the injectors by using driving commands for the injectors and the pressure measured by the pressure measurer. The controller is configured to perform a normal mode in which one of the injectors is driven in a case where a needed power for the fuel cell stack is lower than a predetermined value, and perform a high load mode in which two or more of the injectors are driven when the needed power is equal to or higher than the predetermined value. The controller is configured to output a driving command to each of the injectors under a condition that the normal mode is to be performed, and detect closing failure in one injector driven under the driving command when the pressure measured by the pressure measurer after a time point at which the driving command is output is lower than a predetermined threshold.

According to the aspect, at a low load at which the consumption rate of the fuel gas is relatively slow, closing failure in all the injectors can be detected. Therefore, the occurrence of insufficient supply of the fuel to the fuel cell stack at the time of detection of failure can be suppressed, and thus the deterioration in a fuel cell can be suppressed.

In the fuel cell system according to the aspect, the controller may be configured to detect the closing failure after setting a fuel supply pressure for the fuel cell stack to a value equal to or higher than a predetermined value under the condition that the normal mode is to be performed.

According to the aspect, a fuel cell system capable of suppressing the occurrence of insufficient supply of a fuel into a fuel cell stack at the time of detection of failure and suppressing the deterioration in a fuel cell can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
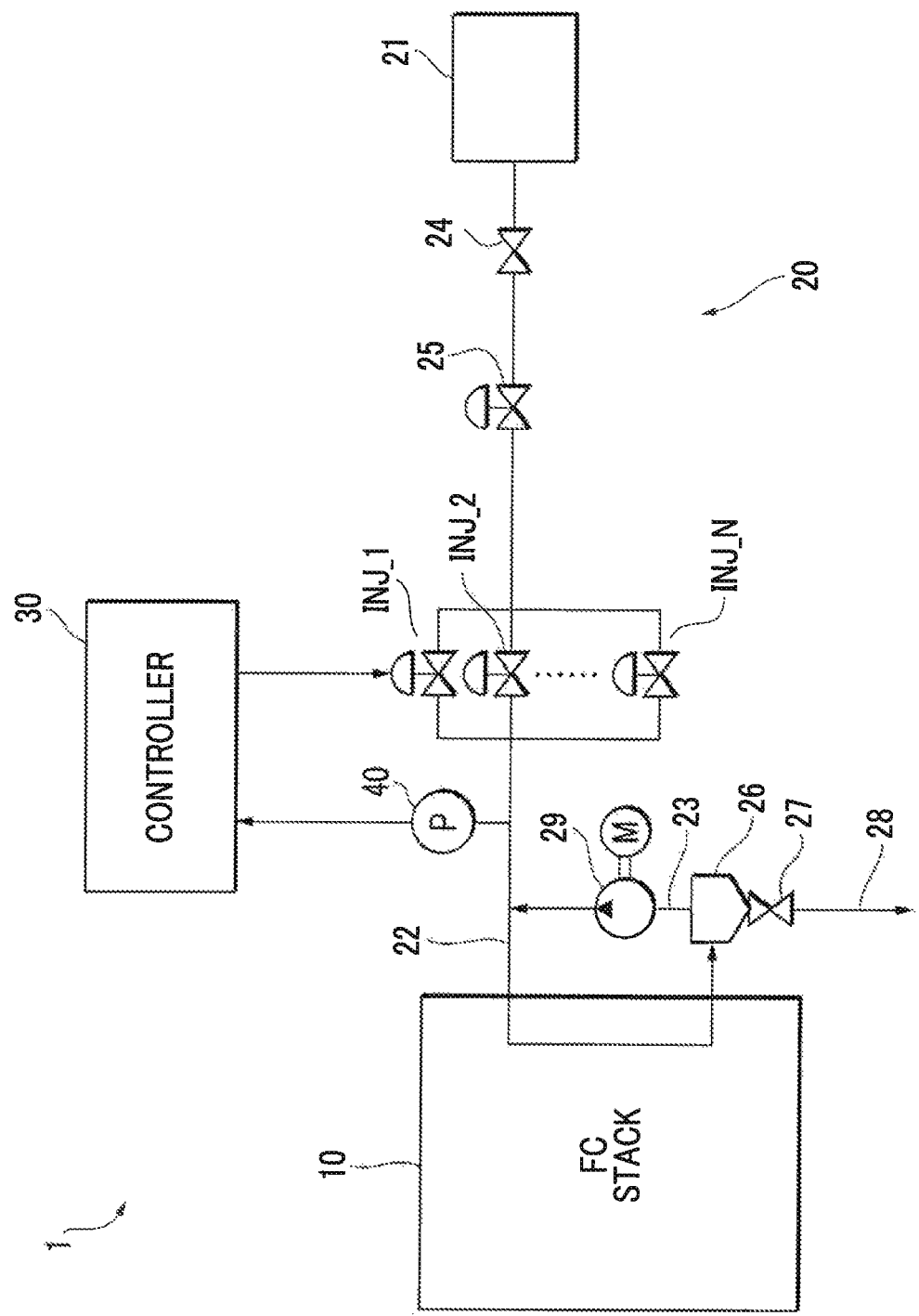
FIG. 1 is a block diagram illustrating a schematic configuration of a fuel cell system according to an embodiment.

Exemplary embodiments of the disclosure will be described with reference to the accompanying drawings. In the drawings, elements denoted by the same reference numeral are the sane or have the same configuration.

First, referring to FIG. 1, a configuration of a fuel cell system 1 according to an embodiment will be described. The fuel cell system 1 according to the embodiment includes a fuel cell stack 10 (FC stack) that is supplied with reaction gases (an oxidizing gas and a fuel gas) and generates power, and also includes an oxidizing gas piping system that supplies air as the oxidizing gas to the fuel cell stack 10, a hydrogen gas piping system 20 that supplies hydrogen gas as the fuel gas to the fuel cell stack 10, a controller (in the embodiment, controller) 30 that performs integrated control of the entire system, and the like. In FIG. 1, among the elements, the fuel cell stack 10, the hydrogen gas piping system 20, the controller 30 (controller, or operator).

The fuel cell stack 10 has a stacked structure configured by stacking a needed number of single cells that are supplied with the reaction gases and generate power.

The hydrogen gas piping system 20 includes a hydrogen tank 21 as a fuel supply source that stores high-pressure hydrogen gas, a hydrogen supply flow path 22 (fuel supply flow path) used to supply the hydrogen gas in the hydrogen tank 21 to the fuel cell stack 10, and a circulation flow path 23 used to return hydrogen off-gas discharged from the fuel cell stack 10 to the hydrogen supply flow path 22.

On the hydrogen supply flow path 22, along a direction from the upstream side (the hydrogen tank 21 side) toward the downstream side (the FC stack 10 side), a main stop valve 24 that blocks or allows the supply of the hydrogen gas from the hydrogen tank 21, a medium pressure reducing valve 25 that adjusts the pressure of the hydrogen gas, and a plurality of injectors INJ_1, INJ_2, . . . , INJ_N arranged in parallel are provided. A pressure measurer (in the embodiment, pressure sensor) 40 that measures the pressure of the hydrogen gas in the hydrogen supply flow path 22 is provided downstream of the injectors INJ_1, INJ_2, . . . , INJ_N and upstream of the junction of the hydrogen supply flow path 22 and the circulation flow path 23.

The medium pressure reducing valve 25 is a device that adjusts the upstream side pressure (primary pressure) of the medium pressure reducing valve 25 to a secondary pressure set in advance. The medium pressure reducing valve 25 is, for example, a mechanical pressure reducing valve (pressure regulating valve, regulator) that reduces the primary pressure.

The injectors INJ_1, INJ_2, . . . , INJ_N supply the hydrogen gas to the fuel cell stack 10. The injectors INJ_1, INJ_2, . . . , INJ_N are electromagnetic drive type on-off valves capable of adjusting gas states such as the flow rate of the gas and the pressure of the gas by directly driving a valve body in a predetermined driving cycle with an electromagnetic driving force to be separated from a valve seat. A gas injection time and a gas injection timing of the individual injectors INJ_1, INJ_2, . . . , INJ_N are controlled by control signals output from the controller 30, so that the flow rate and the pressure of the hydrogen gas are controlled with high accuracy.

The flow rate of the gas is adjusted by opening or closing the valve body of the injectors INJ_1, INJ_2, . . . , INJ_N, and the pressure of the gas supplied to the downstream side of the injectors INJ_1, INJ_2, . . . , INJ_N is lower than the pressure of the gas supplied to the upstream side of the injectors INJ_1, INJ_2, . . . , INJ_N. Therefore, the injectors INJ_1, INJ_2, . . . , INJ_N can be understood as a pressure regulating valve (pressure reducing valve, or regulator).

A discharge flow path 28 is connected to the circulation flow path 23 via a vapor-liquid separator 26 and an exhaust and drain valve 27. The vapor-liquid separator 26 recovers moisture from the hydrogen off-gas. The exhaust and drain valve 27 is operated by a command from the controller 30 to discharge (purge) the moisture recovered by the vapor-liquid separator 26 and the hydrogen off-gas including impurities in the circulation flow path 23 to the outside.

In addition, the circulation flow path 23 is also provided with a hydrogen pump 29 that pressurizes the hydrogen off-gas in the circulation flow path 23 and sends out the hydrogen off-gas to the hydrogen supply flow path 22 side.

The controller 30 controls operations of the fuel cell system 1. In a case where the fuel cell system 1 is mounted in a vehicle, the controller 30 measures an operation amount of an acceleration operation device (accelerator or the like) provided in the vehicle, receives control information such as an acceleration need value (for example, the amount of generated power needed for a load device such as a driving motor), and controls operations of various devices in the system.

In addition, the load device is the collective term for, in addition to the driving motor, auxiliary devices (for example, motors of a compressor, the hydrogen pump 29, a cooling pump, and the like) needed to operate the fuel cell stack 10, actuators (a transmission, a wheel control device, a steering device, a suspension device, and the like) used in various devices involved in travelling of the vehicle, and power consumption devices including an air conditioning device (air conditioner) for an occupant space, a lighting system, an audio system, and the like.

Particularly in the embodiment, the controller 30 has a function of a controller that controls the operations of the injectors INJ_1, INJ_2, . . . , INJ_N arranged in parallel on the hydrogen supply flow path 22. More specifically, the controller 30 may perform "injector driving control" to change the number of injectors to be driven among the injectors INJ_1, INJ_2, . . . , INJ_N, according to the load level of a power needed for the fuel cell stack 10. In addition, the controller 30 has a function of an operator that performs "closing failure detection control" to detect closing failure in each of the injectors by determining the presence or absence of the occurrence of closing failure in each of the injectors INJ_1, INJ_2, . . . , INJ_N. Here, the term "closing failure" refers to an abnormality in which the injector cannot be transited from a closed state to an opened state, for example, due to the valve body of the injector being fixed to the valve seat, or the like.

The controller 30 is physically an electronic circuit mainly having a well-known microcomputer including a central processing unit (CPU), a random access memory (RAM), a read only memory (ROM), and an interface. Each of the functions of the controller 30 described above is realized by loading an application program stored in the ROM and executing the application program by the CPU to operate various devices in the vehicle under the control by the CPU, and reading and writing data from and on the RAM or the ROM. In the case where the fuel cell system 1 is mounted in the vehicle, the controller 30 can also be mounted as a portion of an ECU that performs various control of the vehicle.

Figure 2:
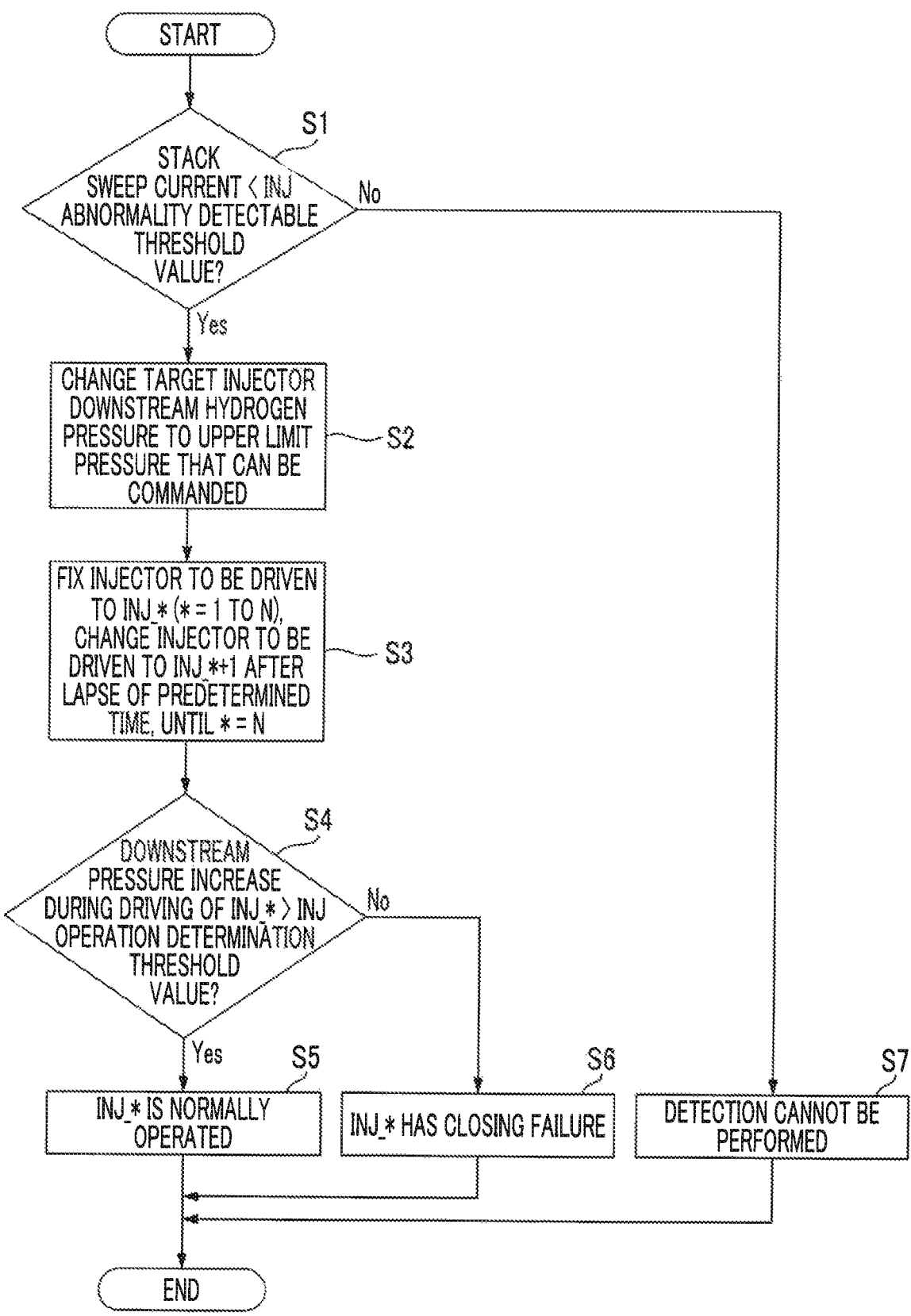
FIG. 2 is a flowchart of closing failure detection control performed by the fuel cell system.

Next, the operations of the fuel cell system 1 according to the embodiment will be described with reference to FIG. 2. First, the summary of the injector driving control and the closing failure detection control described above will be described.

In the fuel cell system 1 of the embodiment, the injector driving control to change the number of injectors to be driven according to the load for the purpose of improving the fuel efficiency by reducing the injector drive electric power at a low load is performed. During the injector driving control, the controller 30 basically performs control of the amount of the fuel supplied to the fuel cell stack 10 by driving one of the injectors INJ_1, INJ_2, . . . , INJ_N at a low load (for example, during normal travelling on a flat road or the like) at which the needed power for the fuel cell stack 10 is lower than a predetermined value (hereinafter, referred to as "normal mode"). In addition, at a high load (for example, during high-load travelling on an uphill road or the like) at which the needed power for the fuel cell stack 10 is equal to or higher than the predetermined value, the controller 30 performs the control of the amount of the fuel supplied to the fuel cell stack 10 by driving two or more of the injectors INJ_1, INJ_2, . . . , INJ_N (for example, all the injectors) (hereinafter, referred to as "high-load mode"). In a configuration in which the number of injectors INJ_1, INJ_2, . . . , INJ_N is three or more, the high-load mode may be subdivided into a plurality of modes such as a mode in which two injectors are used and a mode in which three injectors are used.

It can be said, in other words, that during the injector driving control, the controller 30 decreases the number of injectors to be driven as the load of the needed power for the fuel cell stack 10 decreases, and increases the number of injectors to be driven as the load increases. For example, in a case where the needed power is in a low load region, the injector INJ_1 illustrated in FIG. 1 is solely operated. In a case where the needed power is in an intermediate load region, the injector INJ_2 in addition to the injector INJ_1 is also operated. In a case where the needed power is in a high load region, the injector INJ_N in addition to the injector INJ_1 and the injector INJ_2 can also be operated.

Here, in order to realize a reduction in costs and variations of the fuel cell system 1, an existing CNG injector or the like may be used as each of the injectors INJ_1, INJ_2, . . . , INJ_N. That is, the injectors INJ_1, INJ_2, . . . , INJ_N may have the same degree of injection performance.

During the injector driving control, for example, in the fuel cell stack 10 in a normal operation, an oxidation reaction of Equation occurs at the anode, and a reduction reaction of Equation occurs at the cathode.

$$\text{AN: } 2H_2 \rightarrow 4H^+ + 4e^- \qquad (1)$$

$$\text{CA: } O_2 + 4H^+ + 4e^- \rightarrow 2H_2O \qquad (2)$$

During the injector driving control, in a case where there is an injector that is driven solely at a high load (for example, the injector INJ_N in FIG. 1), when the injector has failed by being fixed to a closed state or the like, during a high load sweep (a relatively fast hydrogen consumption rate), there is a possibility that the supply of hydrogen may become insufficient and this may result in the degradation in the performance of the fuel cell. In the fuel cell stack 10 at the time of the complete deficiency of hydrogen, catalyst-supporting carbon is oxidized and reduced in amount as shown in Equation at the anode, and thus the catalyst falls off, resulting in the degradation in performance. A reduction reaction of Equation occurs at the cathode.

$$\text{AN: } C + 2H_2O \rightarrow CO_2 + 4H^+ + 4e^- \qquad (3)$$

$$\text{CA: } O_2 + 4H^+ + 4e^- \rightarrow 2H_2O \qquad (4)$$

In the embodiment, the fuel cell system 1 is configured such that the degradation in the performance of the fuel cell due to the insufficient supply of hydrogen does not occur and detection of closing failure in the injectors arranged in parallel can be performed during an operation. Specifically, the controller 30 performs the closing failure detection control solely at a low load at which the hydrogen consumption rate is relatively low (that is, under a condition that the normal mode of the injector driving control described above can be performed). In addition, in order to avoid the insufficient supply of hydrogen due to a problem in the operation of the injector in which the closing failure is detected, when the closing failure detection control is performed, a hydrogen supply pressure (fuel supply pressure) is increased in advance to a predetermined value (for example, an upper limit pressure that can be commanded by the controller 30). In addition, under the condition described above, detection of failure in all the injectors is performed by alternately operating the injectors at regular time intervals. In addition, the presence or absence of closing failure in the injectors is detected by monitoring an increase in the pressure on the downstream side while the individual injectors are driven.

A specific process of the closing failure detection control will be described with reference to FIG. 2. The process shown in the flowchart of FIG. 2 is performed by the controller 30, for example, in every predetermined cycle.

In step S1, the controller 30 determines whether or not the stack sweep current of the fuel cell stack 10 is lower than a predetermined INJ abnormality detectable threshold value. The INJ abnormality detectable threshold value can be determined by considering, for example, flow rate characteristics due to the primary/secondary pressure difference of the injector, the energisation time, the intersection of the pressure sensor 40, and the generated current value of the fuel cell stack 10.

As a result of the determination in step S1, in a case where the stack sweep current is lower than the INJ abnormality detectable threshold value (Yes in step S1), the controller 30 determines that the fuel cell system 1 is in a low load operation in which the needed power for the fuel cell stack 10 is lower than the predetermined value and under the condition that the normal mode of the injector driving control is performed, and the closing failure detection control of steps S2 to S6 described below is performed.

In step S2, a target injector downstream hydrogen pressure is changed to an upper limit pressure that can be commanded. The target injector downstream hydrogen pressure is, for example, a target value of the pressure of the hydrogen gas on the downstream side of the injectors INJ_1, INJ_2, . . . , INJ_N of the hydrogen supply flow path 22, which can be measured by the pressure sensor 40. When the process of step S2 is completed, the process proceeds to step S3.

In step S3, the injector to be driven is fixed to a predetermined injector INJ_* (*=1 to N) among the injectors INJ_1, INJ_2, . . . , INJ_N. The state is held for a predetermined time, and the pressure on the downstream side of the injector INJ_* is acquired. After the lapse of the predetermined time, the injector to be driven is changed to another injector INJ_*+1 with a symbol subscript increased by 1, and the pressure on the downstream side thereof is similarly measured for the predetermined time. Changing the injector is performed until *–N is satisfied and all the injectors are selected. When the process of step S3 is completed, the process proceeds to step S4.

In step S4, the controller 30 determines whether or not a downstream pressure increase value of each injector INJ_* (*=1 to N) among the injectors during driving of the injector INJ_* is higher than a predetermined INJ operation determination threshold value.

As a result of the determination in step S4, in a case where the downstream pressure increase value of the injector INJ_* during the driving of the injector INJ_* is higher than the predetermined INJ operation determination threshold value (Yes in step S4), the controller 30 determines that the injector INJ_* is normally operated in step S5.

On the other hand, as a result of the determination in step S4, in a case where the downstream pressure increase value of the injector during the driving of the injector is equal to or lower than the predetermined INJ operation determination threshold value (No in step S4), the controller 30 determines that the injector has closing failure in step S6. When the determination of steps S4 to S6 is performed on all the injectors INJ_1, INJ_2, . . . , INJ_N, the control flow is ended.

As a result of the determination of step S1, in a case where the stack sweep current is equal to or higher than the INJ abnormality detectable threshold value (No in step S1), the controller 30 determines that the fuel cell system 1 is in a high load operation in which the needed power for the fuel cell stack 10 is higher than the predetermined value and under the condition that the high load mode of the injector driving control is performed, determines that detection of the closing failure in the injector cannot be performed in step S7, and ends the control flow without performing the closing failure detection control.

Next, the effects of the fuel cell system 1 according to the embodiment will be described. The fuel cell system 1 of the embodiment includes the fuel cell stack 10, the injectors INJ_1, INJ_2, . . . , INJ_N that supply the fuel gas to the fuel cell stack 10, the pressure sensor 40 that measures the pressure of the hydrogen supply flow path 22 provided with the injectors INJ_1, INJ_2, . . . , INJ_N, and the controller 30 that has the functions of the controller and the operator. The function of the controller is a function of controlling the operations of the injectors INJ_1, INJ_2, . . . , INJ_N. The function of the operator is a function of detecting the closing failure in the injectors INJ_1, INJ_2, . . . , INJ_N using a driving command for the injectors INJ_1, INJ_2, . . . , INJ_N and the pressure measured by the pressure sensor 40. The controller 30 as the controller is configured to perform the normal mode in which one of the injectors INJ_1, INJ_2, ..., INJ_N is driven in the case where the needed power for the fuel cell stack 10 is lower than the predetermined value, and perform the high load mode in which two or more of the injectors INJ_1, INJ_2, ..., INJ_N are driven in the case where the needed power is equal to or higher than the predetermined value. In addition, the controller 30 as the operator outputs a driving command to each of the injectors INJ_1, INJ_2, ..., INJ_N under the condition that the normal mode can be performed, and detects closing failure in one injector driven under the driving command in the case where the pressure measured by the pressure sensor 40 after the time point at which the driving command is output is lower than a predetermined threshold.

With the configuration described above, at a low load at which the consumption rate of hydrogen as the fuel gas is relatively slow, closing failure in all the injectors INJ_1, INJ_2, ..., INJ_N can be detected. Therefore, the fuel cell system 1 of the embodiment can suppress the occurrence of insufficient supply of hydrogen to the fuel cell stack 10 at the time of detection of failure at which the closing failure detection control is performed, and thus can suppress the deterioration in the fuel cell.

In addition, in the fuel cell system 1 of the embodiment, the controller 30 as the operator performs detection of closing failure after setting the hydrogen supply pressure for the fuel cell stack 10 to a value equal to or higher than the predetermined value (for example, the upper limit pressure) under the condition that the normal mode can be performed.

With the configuration described above, closing failure can be detected in a state in which hydrogen as the fuel gas is sufficiently supplied to the fuel cell stack 10. Therefore, the fuel cell system 1 of the embodiment can more reliably suppress the occurrence of insufficient supply of hydrogen at the time of detection of failure and can suppress the deterioration in the fuel cell.

The embodiments described above are intended to facilitate understanding of the disclosure and are not intended to interpret the disclosure in a limited way. Each of the elements, and the arrangement, materials, conditions, shapes, sizes, and the like of the elements are not limited to those exemplified and can be appropriately changed. The configurations described in the different embodiments can be partially substituted or combined.

In the embodiment, the configuration in which the pressure sensor 40 is provided downstream of the injectors INJ_1, INJ_2, ..., INJ_N in the hydrogen supply flow path 22 and closing failure in the injector is detected by monitoring variation in the injector downstream side pressure measured by the pressure sensor 40 during the operation of the injector is exemplified. However, as the hydrogen gas pressure used for the closing failure detection control, a pressure at a different point on the hydrogen supply flow path 22 can also be used. For example, a configuration in which the pressure sensor 40 is provided upstream of the injectors INJ_1, INJ_2, ..., INJ_N and closing failure is detected by monitoring variation in an injector upstream side pressure measured by the pressure sensor 40 during the operation of the injector may be employed.

In addition, in the embodiment, as illustrated in FIG. 1, the configuration in which the single controller 30 has the functions of both the controller and the operator is exemplified. However, a configuration in which the function of the controller and the function of the operator are mounted in different devices can also be employed.

What is claimed is:

1. A fuel cell system comprising:
   a fuel cell stack;
   a plurality of injectors configured to supply a fuel gas to the fuel cell stack;
   a pressure measurer configured to measure a pressure in a fuel supply flow path on which the injectors are provided; and
   a controller configured to control operations of the injectors, wherein:
   the controller is configured to detect closing failure in the injectors by using driving commands for the injectors and the pressure measured by the pressure measurer;
   the controller is configured to perform a normal mode in which one of the injectors is driven when a needed power for the fuel cell stack is lower than a predetermined value, and perform a high load mode in which two or more of the injectors are driven in a case where the needed power is equal to or higher than the predetermined value; and
   the controller is configured to
   output a driving command to each of the injectors under a condition that a stack sweep current of the fuel cell stack is lower than an abnormality detectable threshold value while the needed power is lower than the predetermined value, and
   detect closing failure in one injector driven under the driving command when the pressure measured by the pressure measurer after a time point at which the driving command is output is lower than a predetermined threshold.

2. The fuel cell system according to claim 1, wherein the controller is configured to detect the closing failure after setting a fuel supply pressure for the fuel cell stack to a value equal to or higher than a predetermined value under the condition that the stack sweep current is lower than the abnormality detectable threshold value while the needed power is lower than the predetermined value.

* * * * *